(12) United States Patent
Skaff et al.

(10) Patent No.: US 9,523,347 B2
(45) Date of Patent: Dec. 20, 2016

(54) MANUAL LIFTING TOOL FOR WIND TURBINES

(75) Inventors: Rudy Skaff, Philadelphia, PA (US); Gonzalo Palacio Gaviria, Philadelphia, PA (US)

(73) Assignee: GAMESA INNOVATION & TECHNOLOGY, S.L., Sarriguren (Navarra) (ES)

( * ) Notice: Subject to any disclaimer, the term of this patent is extended or adjusted under 35 U.S.C. 154(b) by 1096 days.

(21) Appl. No.: 13/353,037

(22) Filed: Jan. 18, 2012

(65) Prior Publication Data
US 2013/0180349 A1  Jul. 18, 2013

(51) Int. Cl.
*B66F 3/08* (2006.01)
*B23P 11/00* (2006.01)
*F03D 1/00* (2006.01)

(52) U.S. Cl.
CPC ............... *F03D 1/003* (2013.01); *F03D 1/00* (2013.01); *F05B 2230/61* (2013.01); *F05B 2230/80* (2013.01); *F05B 2240/916* (2013.01); *Y02B 10/30* (2013.01); *Y02E 10/728* (2013.01); *Y02P 70/523* (2015.11); *Y10T 29/49316* (2015.01); *Y10T 74/18752* (2015.01)

(58) Field of Classification Search
CPC ........... B66C 1/64; B66C 23/70; B66C 17/04; F03D 1/003; F05B 2230/80; F05B 2240/916; F05B 2230/61; Y02B 10/30; Y10T 29/49316
USPC ....... 254/92, 17 R, 103, 124, 126, 324, 424, 254/236, 235, 13; 104/7.2, 2, 7.1, 103.1; 294/85; 248/228.1; 414/41.7, 42.8, 414/800; 212/312
See application file for complete search history.

(56) References Cited

U.S. PATENT DOCUMENTS

| | | | |
|---|---|---|---|
| 4,279,347 A * | 7/1981 | Appleman | B66C 19/007 212/274 |
| 4,378,072 A * | 3/1983 | Appleman | B66C 19/005 212/324 |
| 5,810,183 A * | 9/1998 | Feider | B66C 19/007 212/291 |
| 6,082,207 A * | 7/2000 | Babinski | F16H 25/2204 211/1.51 |
| 6,464,208 B1 * | 10/2002 | Smith | A61H 3/008 212/97 |
| 7,748,547 B2 | 7/2010 | Llorente Gonzalez et al. | |
| 7,883,450 B2 * | 2/2011 | Hidler | 482/69 |
| 7,918,632 B2 * | 4/2011 | Mogensen | F03D 11/00 410/44 |
| 7,997,846 B2 * | 8/2011 | Brunson | E04F 21/1811 187/244 |
| 8,172,100 B2 * | 5/2012 | Kappel | B66C 17/00 212/225 |
| 8,857,771 B2 * | 10/2014 | Streetman | F16L 3/133 248/228.1 |
| 2008/0219828 A1 * | 9/2008 | Schuettenberg | B60D 1/00 414/800 |

(Continued)

*Primary Examiner* — Larry E Waggle, Jr.
*Assistant Examiner* — Mahdi H Nejad
(74) *Attorney, Agent, or Firm* — Ladas & Parry LLP

(57) ABSTRACT

An apparatus for performing a supporting and/or a lifting operation to a wind turbine component inside the wind turbine nacelle is provided. The apparatus comprises at least a tool which comprises a manually operated linear actuator and a mounting device of said linear actuator in an element of the nacelle frame so that said linear actuator can be duly located with respect to the wind turbine component for performing said supporting and/or lifting operation.

19 Claims, 4 Drawing Sheets

(56) References Cited

U.S. PATENT DOCUMENTS

| | | | |
|---|---|---|---|
| 2009/0173573 A1* | 7/2009 | Teichert | E04G 3/30 182/19 |
| 2010/0140573 A1* | 6/2010 | Siemers | B66F 3/18 254/103 |
| 2011/0097202 A1* | 4/2011 | de Buhr | F03D 1/003 415/201 |
| 2011/0135478 A1* | 6/2011 | Kappel | B66C 17/00 416/146 R |
| 2012/0193590 A1* | 8/2012 | Horwath | B66F 7/14 254/92 |

* cited by examiner

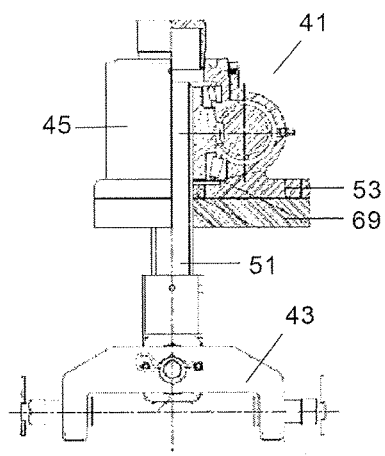
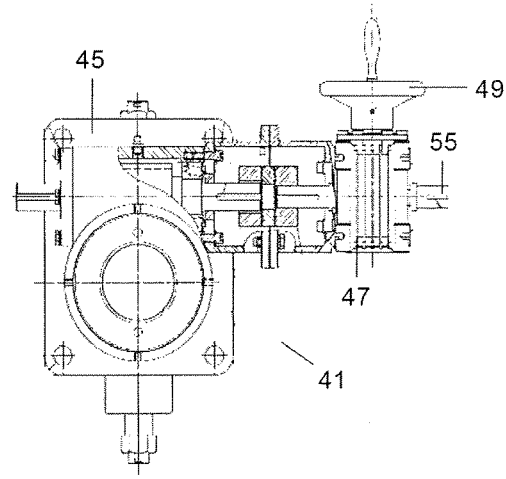
FIG. 3a          FIG. 3b
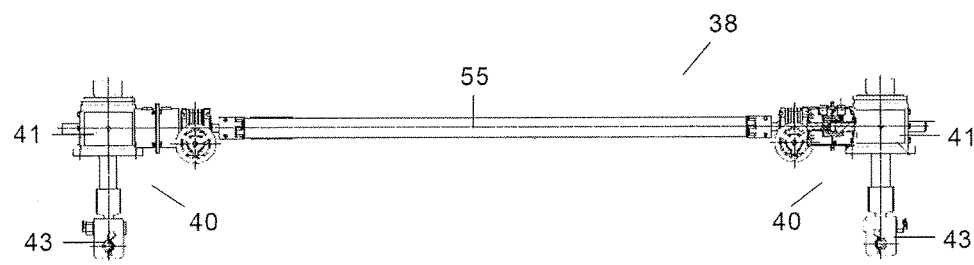
FIG. 4a
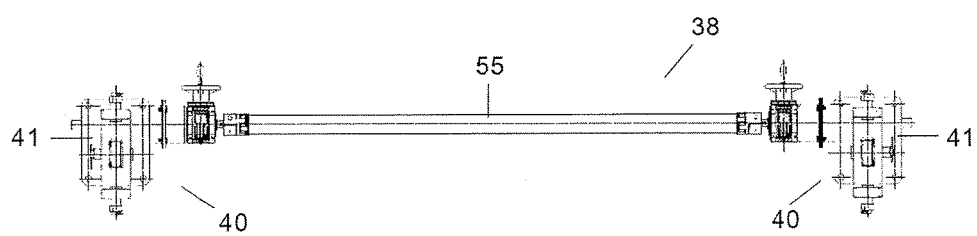
FIG. 4b

MANUAL LIFTING TOOL FOR WIND TURBINES

BACKGROUND OF THE INVENTION

The present invention relates generally to lifting tools for wind turbines and more particularly to manual lifting tools.

Wind turbines are devices that convert mechanical energy to electrical energy. A typical wind turbine includes a nacelle mounted on a tower housing a drive train for transmitting the rotation of a wind rotor to an electric generator and other components such as a yaw drive which rotates the wind turbine, several controllers and a brake. The wind rotor comprises a rotor hub supporting a number of blades extending radially therefore capturing the kinetic energy of the wind and causing the drive-train rotational motion.

Wind turbines are designed to ensure that their main components have a long working life, which means that regular maintenance work on the parts subject to greatest wear shall be carried out. Some of these components, particularly the generator, the gearbox, the rotor and the transformer, are extremely heavy and therefore require the use of a crane for handling.

Bearing in mind the strict limitations regarding maintenance work, given that wind turbines are installed in tall towers and built in, generally, in solitary areas, the use of external cranes leads to problems of availability and cost.

To face these problems wind turbines can be provided with internal cranes to carry out maintenance work on their heavier components without the need for external resources.

For example U.S. Pat. No. 7,748,547 in the name of the applicant discloses a movable independent crane system that can be used temporarily for mounting, moving or replacing components of wind turbines.

When a maintenance work shall be carried out when the wind turbine is de-energized or in commissioning mode, internal cranes needing an electric supply cannot be used so that there is a need of lifting tools that can operate in these situations for performing a variety of maintenance works.

BRIEF DESCRIPTION OF THE INVENTION

An object of the present invention is to provide an apparatus which does not need an electric supply for performing in a wind turbine maintenance works that require supporting and/or lifting wind turbine components.

Another object of the present invention is to provide a method for performing maintenance works in a wind turbine which require supporting and/or lifting wind turbine components without using electric-dependant means.

In one aspect, these and other objects are met by an apparatus for performing a supporting and/or a lifting operation to a wind turbine component inside the wind turbine nacelle, the apparatus comprising at least a tool which comprises a manually operated linear actuator and a mounting device of said linear actuator in an element of the nacelle frame so that said linear actuator can be duly located with respect to the wind turbine component for performing said supporting and/or lifting operation.

In one embodiment, said manually operated linear actuator is a power screw linear actuator. Power screw linear actuators are suitable means for performing maintenance works in wind turbine components that require small vertical displacements such as, for example, the replacement of the feet of the wind turbine transformer or the opening of a door in the roof of the nacelle.

If needed, the power screw linear actuator further comprises a torque reducer to decrease the input torque requirement to a manually feasible level. Suitable manual operating means of the linear actuator are particularly a hand crank or a portable drill.

In one embodiment addressed to perform supporting and lifting operations, the apparatus further comprises an attachment arm with the wind turbine component coupled to the linear actuator through, particularly, coupling means which allow a rotation of the attachment arm with respect to the linear actuator.

In one embodiment, the mounting device of the linear actuator comprises two wedges to be joined to an element of the nacelle frame and a supporting plate of the linear actuator; each wedge comprising a back part and a front part with respect to the wind turbine component configured to be joined so that the element of the nacelle frame can be clamped between them; said supporting plate being configured to be joined to the front part of said two wedges. This mounting device allows, on the one hand, a good orientation of the linear actuator with respect to the wind turbine component and, on the other hand, a firm grip of the linear actuator to said element of the nacelle frame which is, typically, an I-shaped beam.

In one embodiment, the apparatus comprises two tools, each of them comprising a manually operated linear actuator and a mounting device of said linear actuator in an element of the nacelle frame. Therefore the apparatus acts over two points of the wind turbine component facilitating its manual operation and also an improved control of the lifting operation.

Advantageously, an apparatus comprising two tools further comprises a drive shaft connecting both linear actuators so that their manual operation can be synchronized.

In another aspect, the above mentioned objects are met by a method for supporting and lifting a wind turbine component, comprising the following steps:

a) providing an apparatus comprising two tools, each of them comprising a manually operated linear actuator having an attachment arm with the wind turbine component coupled to it and a mounting device of said linear actuator in the nacelle frame;

b) installing said tools in elements of the nacelle frame so that said linear actuators are duly positioned with respect to the wind turbine component for performing said supporting and lifting operation;

c) attaching said wind turbine component to said tools;

d) performing the lifting operation of said wind turbine component operating manually said linear actuators.

This method can be used, for example, for supporting and lifting the wind turbine transformer when their feet are being replaced.

In another aspect, the above mentioned objects are met by a method for lifting a wind turbine component, comprising the following steps:

a) providing an apparatus comprising two tools, each of them comprising a manually operated linear actuator and a mounting device of said linear actuator in the nacelle frame;

b) installing said tools in elements of the nacelle frame so that said linear actuators are duly positioned with respect to the wind turbine component for performing said lifting operation;

c) performing the lifting operation of said wind turbine component operating manually said linear actuators.

This method can be used for example for lifting a door on the roof of the nacelle for allowing the access to it from the outside to, for example, an external crane.

Other desirable features and advantages of the invention will become apparent from the subsequent detailed description of the invention and the appended claims, in relation with the enclosed drawings.

BRIEF DESCRIPTION OF DRAWINGS

FIGS. 3a and 3b are, respectively, side and plan views of the linear actuator of a tool of an apparatus according to the present invention.

FIGS. 4a and 4b are respectively side and plan views of an apparatus according to the present invention comprising two tools and a synchronizing drive shaft.

DETAILED DESCRIPTION OF THE INVENTION

Figure 1:
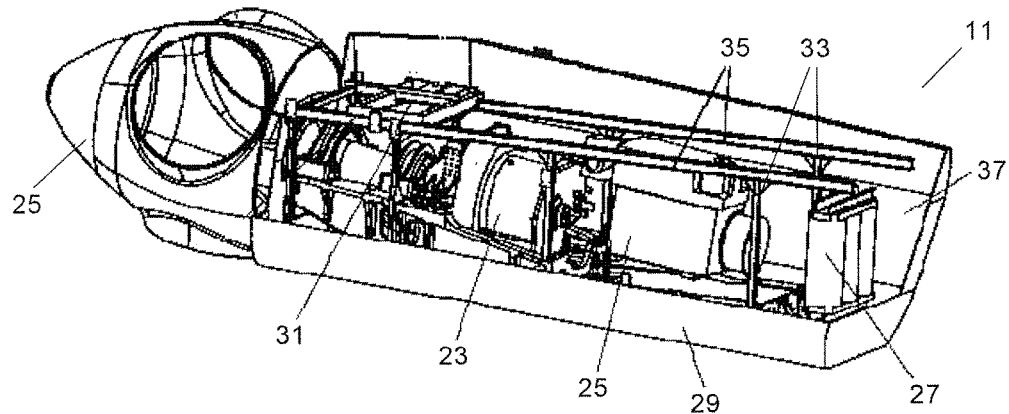
FIG. 1 is a perspective view of a wind turbine nacelle with the roof in an open position.

FIG. 1 shows the nacelle 11 of a wind turbine that houses a gearbox 21 and a generator 23 driven by a shaft coupled to a rotor hub 25 and a transformer 27 supported by the nacelle frame 29. The nacelle frame 29 also includes a supporting structure of a gantry crane 31 formed by vertical and horizontal I-shaped beams 33, 35 which is used for performing mounting/dismounting operations of wind turbine components. The roof 37 of the nacelle 11 is shown in an open position.

Figure 2A:
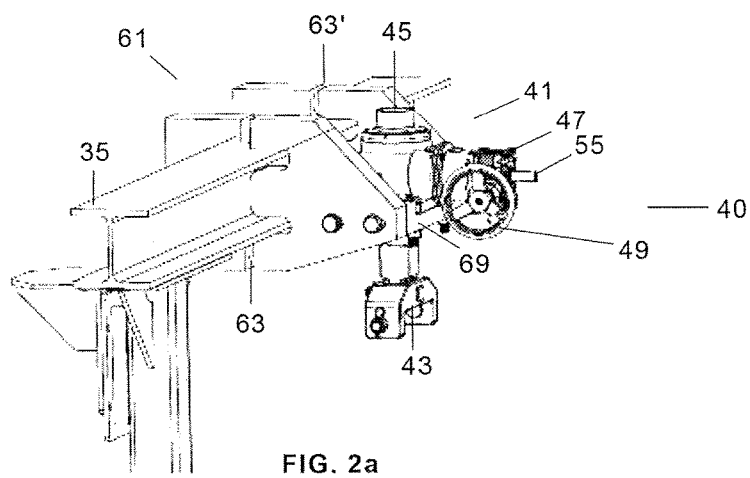
FIGS. 2a and 2b are perspective views of a tool of an apparatus according to the present invention installed on an I-shaped beam.
Figure 2B:
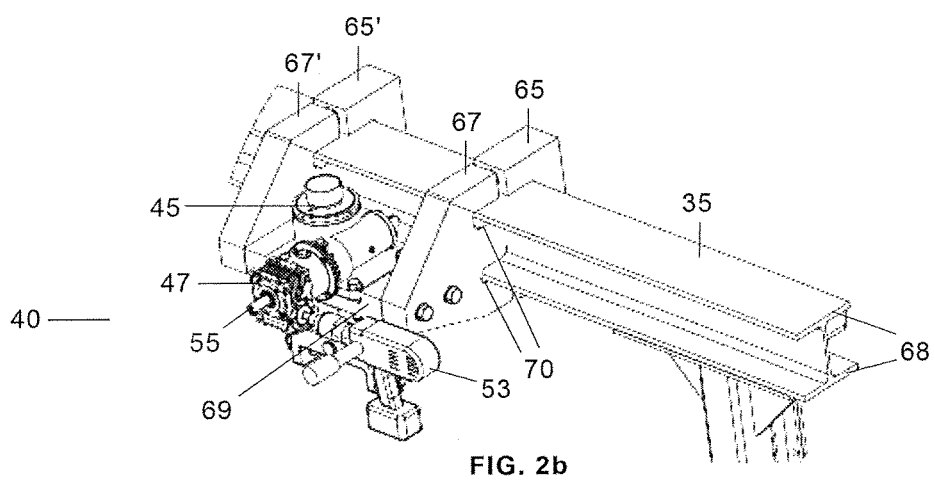

FIGS. 2a and 2b show an apparatus comprising a tool 40 that can be used temporarily for supporting and/or lifting a wind turbine component installed in an I-shaped beam 35 belonging to the nacelle frame 29. The tool 40 comprises a manually operated linear actuator 41 with an attachment arm 43 and a mounting device 61 configured for mounting said linear actuator 41 in said I-shaped beam 35.

The tool 40 can be used as a temporary support means of a wind turbine component attached to it by means of the attachment arm 43 for performing on it a maintenance operation that requires removing its normal supporting means. In this case the linear actuator 41 acts as a simple load path of the weight of wind turbine component to the I-shaped beam 35.

The tool 40 can also be used as a lifting means of a wind turbine component attached to it by means of the attachment arm 43 using the linear actuator 41 for the lifting operation.

The tool 40 can also be used both as a temporary support means and as a lifting means of a wind turbine component.

In the embodiment shown in FIGS. 2a, 3a and 3b the linear actuator 41 comprises a power screw linear actuator 45, a torque reducer 47 and a hand crank 49.

The driving torque generated by a manual operation of the hand crank 49 is transferred to the power screw linear actuator 45 through the torque reducer 47 causing a linear displacement of its screw 51 to perform a lifting operation.

As illustrated in said Figures the power screw linear actuator 45 is configured for lifting operations of a short run.

The only difference between FIGS. 2a and 2b is that the operation means of the power screw linear actuator 45 is a hand crank 49 in the first case and a portable drill 53 in the second case.

FIGS. 2a and 2b also show a drive shaft 55 coupled to the tool 40 which, as will be explained later on, is used in a device comprising two tools 40.

The mounting device 61 comprise two wedges 63, 63', each of them formed by a back part 65, 65' and a front part 67, 67', and a supporting plate 69 for the tool 40 to be attached to the front parts 67, 67' of the two wedges 63, 63'.

The configuration of the two edges 63, 63' is adapted to the I-shape of the supporting beam 35. The back and front parts 65, 65'; 67, 67' include cooperating recesses 70 with the flanges 68 of the beam 35 so that they can be clamped to the beam 35 and joined between them by means of, for example, bolts.

The power screw linear actuator 45 comprises a base 54 as attaching means to the supporting plate 69 of the mounting device 61.

FIGS. 4a and 4b show an apparatus 38 that can be used temporarily for supporting and/or lifting a wind turbine component comprising two tools 40 to be installed in two distant places of the nacelle frame to act over the wind turbine component in two distant places.

The apparatus 38 further comprise a drive shaft 51 coupled to the shafts of the tools 40 for synchronizing the lifting operation.

Figure 5A:
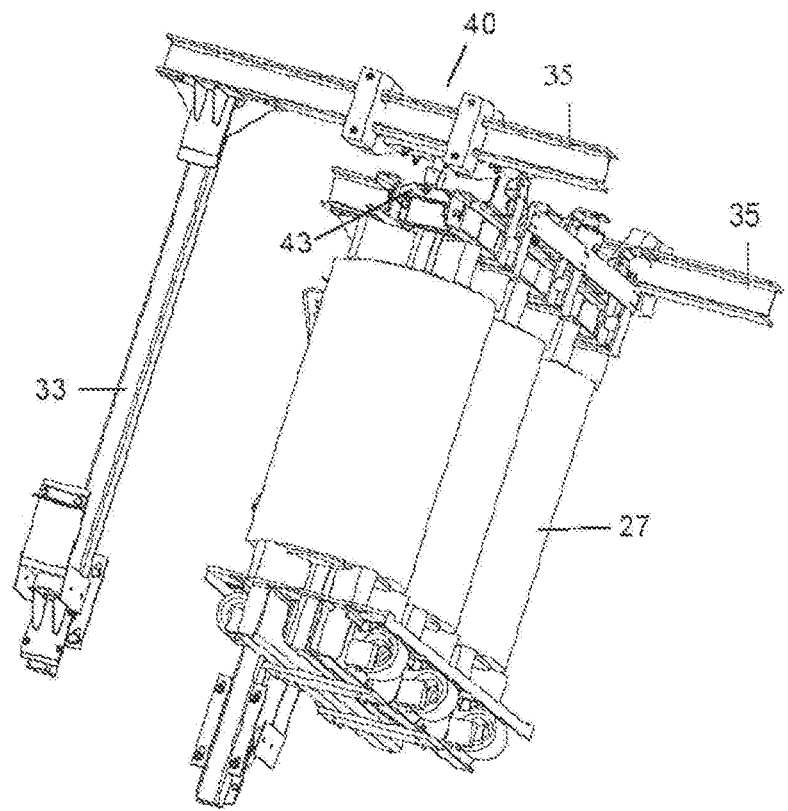
FIG. 5a is a perspective view of an apparatus according to the present invention installed on I-shaped beams having attached to it a wind turbine transformer and FIG. 5b is an enlarged view showing one of tools of the apparatus.
Figure 5B:
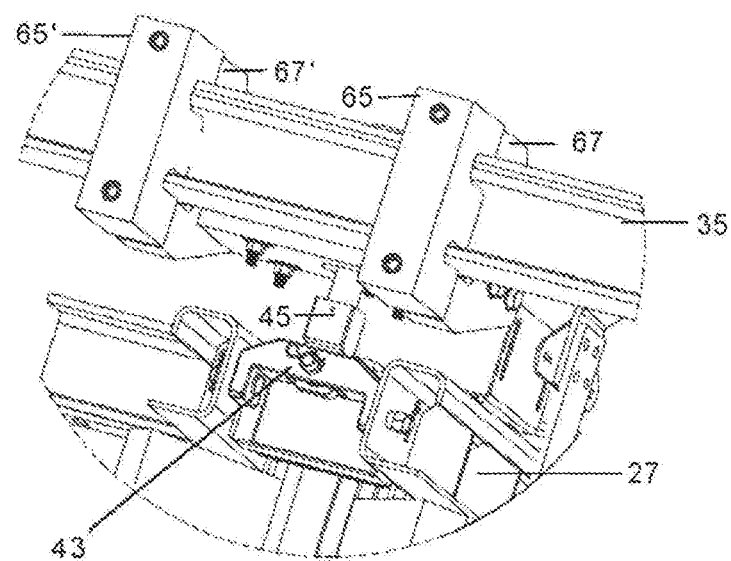

FIGS. 5a and 5b show one of those apparatus with its tools 40 attached to a transformer 27 through attachment arms 43.

The embodiment shown in FIGS. 5a, 5b is suitable, for example, for performing maintenance operations on the wind turbine transformer 27 that require, for example, a replacement of its feet. In that case the apparatus can be used for supporting and lifting the transformer 27 to the height required (usually a few mm) for replacing the transformer feet.

Figure 6A:
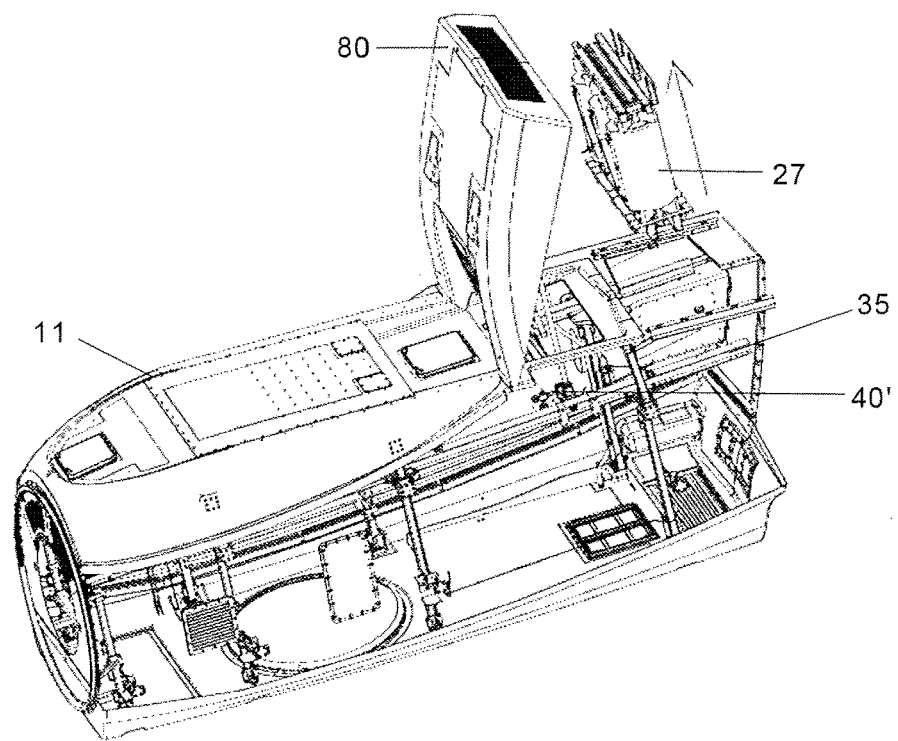
FIG. 6a is perspective view of a wind turbine nacelle having installed an apparatus according to the present invention for lifting a door of the nacelle roof and FIG. 6b is an enlarged view of a tool of said apparatus installed on an I-shaped beam.
Figure 6B:
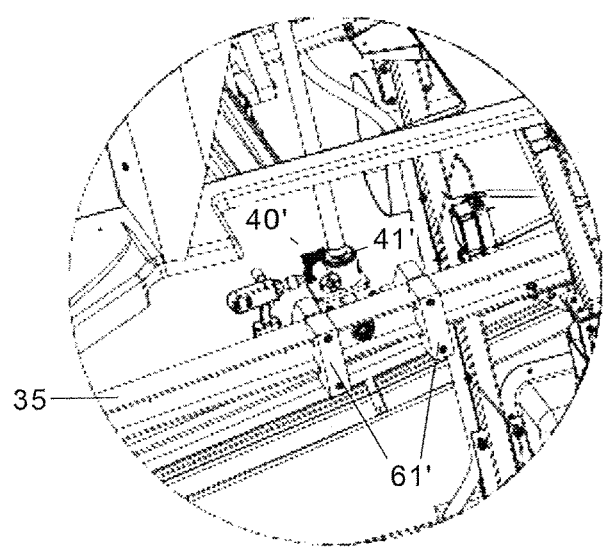

FIGS. 6a and 6b show one of those apparatus with its tools 40' acting temporarily over a roof door 80 so that the transformer 27 can be removed from the nacelle 11.

The apparatus comprises two tools 40' installed in two I-shaped beams 35 of the nacelle frame 29 comprising linear actuators 41' and mounting devices 61'.

The linear actuators 41' have a similar configuration than the linear actuators 41 of the above-mentioned tools 40 with the exception that they do not comprise the attachment arm 43 because the linear actuators 41' act directly as operation arms over the roof door 80. On the other hand, the linear actuators 41' shall be configured for a larger run than the linear actuators 41.

The mounting devices 61' are identical to the mounting devices 61 of the above-mentioned tools 40.

The heaviest part of the above mentioned tools 40, 40' may have a weight of about 30 Kg so that its installation in the wind turbine does not raise any problem.

An important advantage of this invention is that provides a manually operated multi-functional apparatus to perform supporting and/or lifting operations of wind turbine components as an alternative to internal/external cranes particularly when the wind turbine is de-energized or in commissioning mode and also as a complementary means to said cranes for certain maintenance operations.

Although the present invention has been described in connection with various embodiments, it will be appreciated from the specification that various combinations of elements, variations or improvements therein may be made, and are within the scope of the invention.

The invention claimed is:

1. An apparatus to support and/or lift a wind turbine component inside a wind turbine nacelle, said apparatus comprises
at least a tool (40) which comprises a manually operated linear actuator (41) and a mounting device (61) of said linear actuator connected to an element of a nacelle frame (29) of said wind turbine nacelle so that said linear actuator (41) is duly located with respect to the wind turbine component for performing said supporting and/or lilting,
wherein said mounting device (61) comprises two wedges (63, 63') to be joined to the element of the nacelle frame (29) and a supporting plate (69) of the linear actuator; each wedge (63, 63') comprising a back part (65, 65') and a front part (67, 67') with respect to the wind turbine component configured to be joined so that the element of the nacelle frame (29) can be clamped between them; said supporting plate (69) being configured to be joined to the front part (67, 67') of said two wedges (63, 63').

2. The apparatus of claim 1, wherein said linear actuator (41) is a power screw linear actuator (45) comprising a torque reducer (47).

3. The apparatus of claim 2, wherein manual operating means of said power screw linear actuator (45) is a hand crank (49) or a portable drill (53).

4. The apparatus of claim 1, further comprises an attachment arm (43) with the wind turbine component coupled to the linear actuator (41).

5. The apparatus of claim 4, wherein the attachment arm (43) is coupled to the linear actuator (41) with coupling means which allow a rotation of the attachment arm (43) with respect to the linear actuator.

6. The apparatus of claim 1, wherein:
said element of the nacelle frame (29) is an I-shaped beam (35) configured by a web and two flanges (68) extending at both sides of the web; and
the back and front parts (65, 65', 67, 67') of each wedge are configured with cooperating recesses (70) with the flanges (68) of the I-shaped beam (35) for clamping the I-shaped beam (35) between them.

7. The apparatus of claim 1, comprising two tools, each of the two tools (40, 40') comprising a manually operated linear actuator (41, 41') and a mounting device (61, 61') of said linear actuator joined in the element of the nacelle frame (29).

8. The apparatus of claim 7, wherein:
said manually operated linear actuator (41, 41') is a power screw linear actuator (45) having a torque reducer (47), its manual operating means comprising a hand crank (49) or a portable drill (53); and
said mounting device (61, 61') comprise two wedges (63, 63') to be joined to the element of the nacelle frame (29) and a supporting plate (69) of the linear actuator (41, 41'); each wedge (63, 63') comprising a back part (65, 65') and a front part (67, 67') with respect to the wind turbine component con figured to be joined so that the element of the nacelle frame (29) can be clamped between them; said supporting plate (69) being configured to be joined to the front part (67, 67') of said two sedges (63, 63').

9. The apparatus of claim 8, wherein
said element of the nacelle frame (29) is an I-shaped beam (35) configured by a web and two flanges (68) extending at both sides of the web; and
the back and front parts (65, 65', 67, 67') of each wedge (63, 63') are configured with cooperating recesses (70) with the flanges (68) of the I-shaped beam (35) for clamping the I-shaped beam between them.

10. The apparatus of claim 7, wherein each of the two tools (40, 40') further comprise an attachment arm (43) with the wind turbine component to be lifted or supported by the apparatus and coupled to the linear actuator (41).

11. The apparatus of claim 7, further comprising a drive shaft (51) connecting to said both linear actuators (41') so that their manual operation can be synchronized.

12. The apparatus of claim 10, wherein the wind turbine component to be lifted or supported by the apparatus is a door (80) on a root of the wind turbine nacelle.

13. The apparatus of claim 10, wherein the wind turbine component to be lifted or supported by the apparatus is a transformer (27).

14. A method to support and/or lift a wind turbine component inside a wind turbine nacelle, comprising the following steps:
a) providing an apparatus comprising two tools (40, 40'), each of them comprising a manually operated linear actuator (41, 41') having an attachment arm (43) with the wind turbine component coupled to the attachment arm and a mounting device (61, 61') of said linear actuator in a nacelle frame (29);
b) installing said tools (40, 40') in elements of the nacelle frame (29) of the wind turbine nacelle so that said linear actuators (41, 41') are duly positioned with respect to the wind turbine component for performing said supporting and lifting;
c) attaching said wind turbine component to said tools (40, 40');
d) performing the lifting of the wind turbine component operating manually said linear actuators (41, 41'),
wherein said mounting device (61, 61') comprises two wedges (63, 63') to be joined to an element of the nacelle frame (29) and a supporting plate of the linear actuator (41, 41'); each wedge (63, 63') comprising a back part (65, 65') and a front part (67, 67') with respect to the wind turbine component configured to be joined so that the element of the nacelle frame (29) can be clamped between them; said supporting plate (69) being configured to be joined to the front part (67, 67') of said two wedges (63, 63').

15. The method of claim 14, wherein:
said manually operated linear actuator (41, 41') is a power screw linear actuator (45) having a torque reducer (47), its manual operating means comprising a hand crank (49) or a portable drill (53).

16. The method of claim 14, wherein the wind turbine component to be lifted or supported by the apparatus is a transformer (27).

17. The method of claim 14, wherein said wind turbine component is a door (80) on a roof of the nacelle.

18. A method to lift a wind turbine component inside a wind turbine nacelle, comprising the following steps:
a) providing an apparatus comprising two tools, each of them comprising a manually operated linear actuator and a mounting device of said linear actuator in a nacelle frame;

b) installing said tools in elements of the nacelle frame so that said linear actuators are duly positioned with respect to the wind turbine component for performing said lifting;
c) performing the lifting of said wind turbine component operating manually said linear actuators,
wherein said mount ling devices comprise two wedges to be joined to an element of the nacelle frame and a supporting plate of the linear actuator; each wedge comprising a back part and a front part with respect to the wind turbine component configured to be joined so that the element of the nacelle frame can be clamped between them; said supporting plate being configured to be joined to the front part of said two wedges.

19. The method of claim 18 wherein:
said manually operated linear actuator is a power screw linear actuator having a torque reducer, its manual operating means a hand crank or a portable drill.

* * * * *